US011875165B2

(12) United States Patent
Lewis et al.

(10) Patent No.: US 11,875,165 B2
(45) Date of Patent: *Jan. 16, 2024

(54) SYSTEMS, METHODS, AND APPARATUS FOR PROVIDING DYNAMIC AUTO-RESPONSES AT A MEDIATING ASSISTANT APPLICATION (71) Applicant: GOOGLE LLC, Mountain View, CA (US)

(72) Inventors: Justin Lewis, Marina Del Rey, CA (US); Scott Davies, Santa Monica, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/965,054

(22) Filed: Oct. 13, 2022

(65) Prior Publication Data
US 2023/0029783 A1 Feb. 2, 2023

Related U.S. Application Data (63) Continuation of application No. 16/326,814, filed as application No. PCT/US2019/014745 on Jan. 23, 2019, now Pat. No. 11,474,841.
(Continued)

(51) Int. Cl.
G06F 9/451 (2018.01)
G06F 40/20 (2020.01)
(Continued)

(52) U.S. Cl.
CPC .......... *G06F 9/453* (2018.02); *G06F 16/3329* (2019.01); *G06F 16/3334* (2019.01);
(Continued)

(58) Field of Classification Search
CPC .. G06F 9/453; G06F 16/3329; G06F 16/3334; G06F 16/3344; G06F 40/20;
(Continued)

(56) References Cited

U.S. PATENT DOCUMENTS

2012/0016678 A1* 1/2012 Gruber ................ G06F 16/3329
704/E21.001
2013/0275138 A1 10/2013 Gruber
(Continued)

FOREIGN PATENT DOCUMENTS

CN 102792320 11/2012

OTHER PUBLICATIONS

European Patent Office; Communication pursuant to Article 94(3) issued in Application No. 19707905.6, 4 pages, dated Jul. 14, 2022.
(Continued)

*Primary Examiner* — Quoc A Tran
(74) *Attorney, Agent, or Firm* — Gray Ice Higdon (57) ABSTRACT Methods, apparatus, systems, and computer-readable media are provided for providing context specific schema files that allow an automated assistant to broker human-to-computer dialogs between a user and an application that is separate from the automated assistant. The context specific schema file can provide the automated assistant with sufficient data to be responsive to user queries without necessarily communicating with a remote device, such as a server. Multiple different context specific schema files can be made available to the automated assistant according to a context in which a user is interacting with the automated assistant. In this way, latency otherwise exhibited by the automated assistant can be mitigated by providing the automated assistant with the information needed to respond to a user without continually retrieving the information over a network.

20 Claims, 5 Drawing Sheets

Related U.S. Application Data (60) Provisional application No. 62/621,431, filed on Jan. 24, 2018.

(51) Int. Cl.

| | | |
|---|---|---|
| *G06F 16/33* | (2019.01) | |
| *G06F 16/332* | (2019.01) | |
| *G06F 40/30* | (2020.01) | |
| *B62D 1/19* | (2006.01) | |
| *B62D 1/184* | (2006.01) | |
| *B62D 1/185* | (2006.01) | |
| *G06F 16/35* | (2019.01) | |
| *G06F 16/338* | (2019.01) | |
| *G06F 16/383* | (2019.01) | |
| *G06F 3/16* | (2006.01) | |
| *G06F 16/387* | (2019.01) | |
| *G06F 17/00* | (2019.01) | |

(52) U.S. Cl.
CPC .......... *G06F 16/3344* (2019.01); *G06F 40/20* (2020.01); *G06F 40/30* (2020.01); *B62D 1/184* (2013.01); *B62D 1/185* (2013.01); *B62D 1/195* (2013.01); *G06F 3/167* (2013.01); *G06F 16/332* (2019.01); *G06F 16/338* (2019.01); *G06F 16/3323* (2019.01); *G06F 16/3326* (2019.01); *G06F 16/3331* (2019.01); *G06F 16/3343* (2019.01); *G06F 16/3346* (2019.01); *G06F 16/3347* (2019.01); *G06F 16/353* (2019.01); *G06F 16/383* (2019.01); *G06F 16/387* (2019.01)

(58) Field of Classification Search
CPC ........ G06F 40/30; G06F 3/167; G06F 16/332; G06F 16/3323; G06F 16/3326; G06F 16/3331; G06F 16/3343; G06F 16/3346; G06F 16/3347; G06F 16/338; G06F 16/353; G06F 16/383; G06F 16/387; B62D 1/184; B62D 1/185; B62D 1/195
See application file for complete search history.

(56) References Cited

U.S. PATENT DOCUMENTS

| | | |
|---|---|---|
| 2014/0258324 A1 | 9/2014 | Mauro et al. |
| 2016/0350280 A1 | 12/2016 | Lavallee et al. |
| 2017/0160813 A1* | 6/2017 | Divakaran ............ G06N 3/006 |
| 2017/0300831 A1 | 10/2017 | Gelfenbeyn et al. |
| 2018/0129484 A1* | 5/2018 | Kannan ............... G06F 3/04847 |
| 2021/0342168 A1 | 11/2021 | Lewis et al. |

OTHER PUBLICATIONS

European Patent Office; Communication Pursuant to Article 94(3) issue in Application No. 19707905.6; 4 pages; dated Nov. 24, 2020.
European Patent Office; International Search Report and Written Opinion of Ser. No. PCT/US2019/014745; 15 pages; dated Apr. 25, 2019.
China National Intellectual Property Administration; Notification of First Office Action issued in Application No. 201980014410.2; 34 pages; dated Sep. 14, 2023.

* cited by examiner

SYSTEMS, METHODS, AND APPARATUS FOR PROVIDING DYNAMIC AUTO-RESPONSES AT A MEDIATING ASSISTANT APPLICATION

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input.

Some automated assistants can act as an interface between a user and an application with which a user is intending to control. For example, a user can provide a command to initialize an application that is separate from the automated assistant. The automated assistant can communicate the command to the application and thereafter receive a response from the application, which can then be provided back to the user. However, when multiple applications are available for the automated assistant to select from, the automated assistant can exhibit latency when searching for a suitable application to invoke. Furthermore, computational resources and network resources can be wasted when an automated assistant invokes an incorrect application. In order to resolve such issues, an automated assistant can be pre-loaded with responses for the user to more readily receive. Unfortunately, a device that hosts the automated assistant can operate inefficiently when loaded with an extensive amount of responses at one time. Furthermore, the automated assistant can exhibit latency when tasked with repeatedly accessing content over a network each time the automated assistant is queried by a user.

SUMMARY

The present disclosure is generally directed to methods, apparatus, and computer-readable media (transitory and non-transitory) for providing context specific schema files that allow an automated assistant to facilitate human-to-computer dialogs between a user and an application (sometimes referred to as a "third party application") that is separate from the automated assistant. A context specific schema file can be provided to one or more devices that direct the activities of the automated assistant. The context specific schema files can identify entry points through which a user can access an application through an automated assistant. An entry point can include one or more actions that are specified by user to the automated assistant. For example, a ride sharing application can be associated with a context-specific schema file that identifies an action of ordering a ride to a destination. Therefore, an entry point to the application through the automated assistant can include the user ordering a ride to a destination using a command such as, "Assistant, please order me a ride to the airport." In some implementations, a context specific schema file can be temporarily active depending on a context of the user, the automated assistant, and/or the application being invoked. For example, the automated assistant can access one or more context specific schema files at any given time according to a context in which the automated assistant is operating.

Each of the context-specific schema files can include one or more different entry points that are provided according to the context. For instance, if a user is using the ride sharing application to order a ride and the user has already ordered the ride, a context specific schema file can be accessible to the automated assistant during the pendency of the ride. In this case, the context specific schema file can identify entry points to the application that correspond to the ride that was ordered, as well as parameters for responding to queries from the user to the automated assistant. For example, a context-specific schema file can identify an entry point or action of determining a time of arrival of the ride, and/or parameters such as the estimated time of arrival. In this way, the user can access information from the application via the automated assistant by asking the automated assistant when the ride will arrive (e.g., "Assistant, when will my ride arrive?"), and the automated assistant can provide a response using the parameters in the context specific schema file without expressly invoking the application.

In some implementations, a context specific schema can identify actions, intents, parameters, and optionally triggers for causing an automated assistant to invoke an application. A trigger can identify one or more queries or patterns of queries that can be provided by a user in order to cause an automated assistant to invoke or otherwise access on application. For example, a trigger can correspond to subject matter with which an application is associated, such as words or phrases that can describe a name of an application, a function of an application, data that an application can process, and/or any other terms or phrases that can be associated with an application. For instance, a ride sharing application can correspond to the context specific schema file that identifies a trigger such as the term "ride," "destination," "car," and/or "arrive."

In some implementations, one or more triggers can be used to invoke an automated assistant and cause the automated assistant to access a context specific schema file that includes the one or more triggers. In this way, the automated assistant may not necessarily invoke an application in response to receiving a query that identifies a trigger, but rather can access one or more context specific schema files that are associated with an application. The automated assistant can then provide responses to the user, if such information for responding to the user is available in a context specific schema file. As an example, when a user orders a ride by invoking the automated assistant to interact with a ride sharing application, the ride sharing application can provide a context specific schema file to the automated assistant in response to the ordering of a ride. When the user is waiting for the ride to arrive, the user may provide a query such as, "Assistant, when will my ride arrive?" In response, the automated assistant can access the context specific schema file provided by the ride sharing application in order to identify the appropriate response to the user. For example, the context specific schema file can include information regarding the estimated time of arrival for the ride. Therefore, the automated assistant can provide the response to the user without necessarily communicating with the ride sharing application.

In some implementations, multiple different context specific schema files can be considered active at a given time at least according to the automated assistant. In this way, an application that provides the context specific schema files will not be limited to a single schema file from which the automated assistant can operate. Rather, the automated assistant and/or the application can activate and/or deactivate each context specific schema file of the multiple different context specific schema files based on a variety of different factors. For example, a user can invoke the automated assistant in order to initialize an application, and the automated assistant can filter the context specific schema files associated with the application based on the content of an invocation phrase provided by the user. Each context specific schema file can include trigger words or phrases that can allow the context specific schema files to be searched and/or filtered in order for the automated assistant to identify one or more context specific schema files from which to operate.

For instance, when the user invokes the automated assistant to order food from a food ordering application, the food ordering application can provide the automated assistant with context specific schema files that can include trigger words. A first schema file can include a trigger word such as "order," and a second schema file can include a trigger word such as "status." When the automated assistant is invoked for initially providing a food order to the food ordering application, the automated assistant can identify the first schema file, at least based on the trigger word "order." Therefore, the first schema file can be considered active by the automated assistant when the user is placing the food order with the food ordering application via the automated assistant. However, once the food order has been placed, the user may invoke the automated assistant to check a status of their food order in order to find out when the food will be delivered. For instance, the user can provide a natural language input such as, "Assistant, what is the status of the food order?" In response, the automated assistant can search the available context-specific schema files for trigger words or phrases that have some correspondence to the natural language input. When the automated assistant identifies the second schema file as having correspondence to the natural language input, the automated assistant can deactivate the first schema file and activate the second schema file. Alternatively, when the second schema file has been identified as having a correspondence to the natural language input, the application can deactivate the first schema file and activate the second schema file. By allowing certain schema files to be activated and deactivated, latency from the automated assistant can be reduced as schema files can be more readily identified or filtered before responding to a user. Furthermore, computational resources such as memory and processing and bandwidth can be preserved as a reduced number of schema files will need to be managed by the automated assistant for particular responses and/or contexts.

In some implementations, an application can refer a partially installed application that includes less functionality than a complete installation of a corresponding application. For example, a user may install a partially installed application on a computing device in order to determine whether they would like to purchase the complete installation of the corresponding application. The complete installation can be associated with multiple different context specific schema files, and the partially installed application can be associated with a smaller number of context specific schema files than the complete installation. In this way, the user will be able to interact with the partially installed application via the automated assistant without having to purchase the complete installation of the application. Furthermore, because activation of the context specific schema files is dynamic, the application, or a server associated with the application, can provide the context specific schema files to the automated assistant based on a version of the application that the user has installed or is otherwise accessing. For example, when the user accesses the partially installed application, the automated assistant can be provided with a first number of context specific schema files. Furthermore, when the user accesses the complete installation of the application, the automated assistant can be provided with a second number of context specific schema files that is greater than the first number of context specific schema files. However, in some implementations the number of context specific schema files available to the automated assistant can be based on data associated with interactions between the user and the automated assistant.

The above description is provided as an overview of some implementations of the present disclosure. Further description of those implementations, and other implementations, are described in more detail below.

In some implementations, a method implemented by one or more processors is set forth as including operations such as determining that an application is available at a computing device. The computing device can include an automated assistant that is configured to mediate performance of an action by the application. The method can further include providing, in response to determining that the application is available at the computing device, a first context specific schema file to the computing device. The first context specific schema file can include responsive content provided in anticipation of the automated assistant receiving a request for the application to perform the action. The method can also include determining that the automated assistant has received the request for the application to perform the action, and providing, in response to determining that the automated assistant has received the request, a second context specific schema file to the computing device. The second context specific schema file can include other content provided in anticipation of the automated assistant receiving a separate request associated with the action being performed by the application.

The computing device can include an automated assistant interface and the responsive content includes natural language data adoptable by the automated assistant. The first context specific schema file can identify multiple different actions capable of being performed by the application and initialized via the automated assistant. The method can also include modifying a status identifier to indicate that at least the first context specific schema file and the second context specific schema file are accessible to the automated assistant. The status identifier further can indicate that another context specific schema file associated with the application is inaccessible from the computing device. The automated assistant can be configured to bypass contacting a remote device associated with the application in response to receiving the separate request, and provide a response to the separate request in accordance with the second context specific schema file.

In other implementations, a method implemented by one or more processors is set forth as including operations such as receiving, at an automated assistant interface, a first request for an automated assistant to mediate performance of an action by an application that is separate from the automated assistant; determining, by the automated assistant, whether a context specific schema file is accessible to the automated assistant and includes content that corresponds to the action to be performed by the application. The context specific schema file can be configured to enable the automated assistant to provide responses on behalf of the application. The method can also include, when the automated assistant determines that the context specific schema file is accessible and provides content that corresponds to the action to be performed by the application: causing the application to initialize performance of the action; receiving, at the automated assistant interface, a second request for the automated assistant to provide a response that is associated with the action being performed by the application; determining, by the automated assistant, whether the content of the context specific schema file is capable of satisfying the second request. The method can further include, when the automated assistant determines that the content of the context specific schema file is capable of satisfying the second request: generating the response according to the content of the context specific schema file. In some implementations, the method can include, when the automated assistant determines that the content of the context specific schema file is incapable of satisfying the second request: generating a schema file request, wherein the schema file request corresponds to a query for retrieving another context specific schema file for fulfilling the second request. In some implementations, the method can include, when the automated assistant determines that the content of the context specific schema file is incapable of satisfying the second request: receiving the other context specific schema file, and generating a separate response according to other content that is provided in the other context specific schema file.

The schema file request can include contextual data that identifies a context in which the automated assistant received the first request. The method can also include, when the automated assistant determines that the content of the context specific schema file is void of content that corresponds to the action to be performed by the application: generating a schema file request. The schema file request can correspond to a query for retrieving another context specific schema file that includes content corresponding to the action to be performed by the application. The method can further include, when the automated assistant determines that the content of the context specific schema file is void of content that corresponds to the action to be performed by the application: receiving the other context specific schema file, and causing the application to initialize performance of the action at least based on other content provided in the other context specific schema file. Determining whether the context specific schema file is accessible to the automated assistant can include: accessing a file storage that includes one or more context specific schema files, and comparing request content from the first request to schema file content from the one or more context specific schema files.

In yet other implementations, a method implemented by one or more processors is set forth as including operations such as receiving a first request for an automated assistant to initialize performance of an action by an application that is accessible to a client device. The client device can include a schema file configured to provide responsive content that allows the automated assistant to respond to requests on behalf of the application; determining whether a correspondence exists between the action associated with the first request and the schema file; causing, based on determining that the correspondence between the action and the schema file exists, the application to initialize performance of the action; receiving a second request for the automated assistant to provide a response associated with the action on behalf of the application; and determining whether the schema file includes responsive content that is correlated with the second request; and providing, based on determining that the schema file includes responsive content that is correlated with the second request, the response associated with the action via an automated assistant interface of the client device. In some implementations, the method can include causing, based on determining that the schema file is void of a correspondence to the first request, the automated assistant or the application to request a different schema file that provides the correspondence to the first request. In other implementations, the method can include causing, based on determining that the schema file is void of responsive content that is correlated with the second request, the automated assistant or the application to request a different schema file that provides other responsive content that is correlated to the second request. Providing the response associated with the action can include: generating a natural language response that is based on the responsive content provided in the schema file. Determining whether the correspondence exists between the action associated with the first request and the schema file can include: identifying, from multiple schema files available at the computing device, the schema file that includes intent data that identifies the action. The method can also include causing, in response to receiving the first request, contextual data to be provided to a remote device that is associated with the application, wherein the contextual data can identify the action. The method can further include receiving, from the remote device, a separate schema file that includes supplemental content that allows the automated assistant to be responsive to a user on behalf of the application when the application is performing the action.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
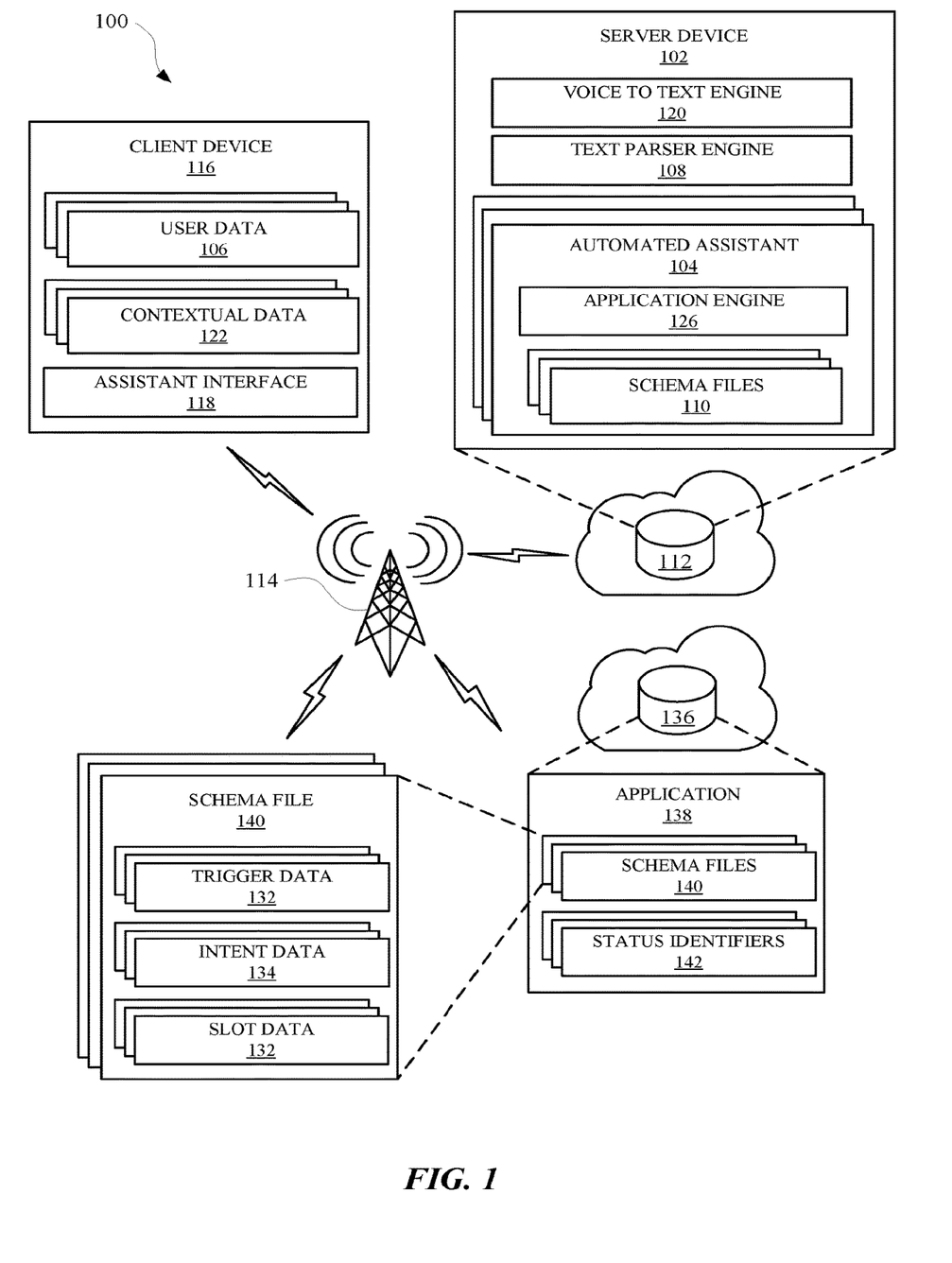
FIG. 1 illustrates a system for providing context specific schema files to an automated assistant to allow the automated assistant to more readily mediate interactions between a user and an application.

FIG. 1 illustrates a system 100 for providing context specific schema files to an automated assistant 104 to allow the automated assistant 104 to more readily facilitate interactions between a user and an application 138. The automated assistant 104 can operate as part of an assistant application that is provided at one or more computing devices, such as a client device 116 (e.g., a cellular phone or a standalone speaker device), and/or a remote computing device 112, such as a server device 102. A user can interact with the automated assistant 104 via an assistant interface, which can be a microphone, a camera, a touch screen display, a user interface, and/or any other apparatus capable of providing an interface between a user and an application. For instance, a user can initialize the automated assistant 104 by providing a verbal, textual, or a graphical input to the assistant interface to cause the automated assistant 104 to perform a function (e.g., provide data, control a peripheral device, access an agent, etc.). The client device 116 can include a display device, which can be a display panel that includes a touch interface for receiving touch inputs and/or gestures for allowing a user to control applications of the client device 116 via the touch interface.

The client device 116 can be in communication with the remote computing device 112 over one or more networks 114, such as the Internet. The client device 116 can offload computational tasks to the remote computing device 112 in order to conserve computational resources at the client device 116. For instance, the remote computing device 112 can host the automated assistant 104, and the client device 116 can transmit inputs received at one or more assistant interfaces to the remote computing device 112. However, in some implementations, the automated assistant 104 can be hosted at the client device 116. In various implementations, all or less than all aspects of the automated assistant 104 can be implemented on the client device 116. In some of those implementations, aspects of the automated assistant 104 are implemented via a local assistant application of the client device 116 and interface with the remote computing device 112 that implements other aspects of the automated assistant 104. The remote computing device 112 can optionally serve a plurality of users and their associated assistant applications via multiple threads. In some implementations where all or less than all aspects of the automated assistant 104 are implemented via a local assistant application of the client device 116, the local assistant application can be an application that is separate from an operating system of the client device 116 (e.g., installed "on top" of the operating system)—or can alternatively be implemented directly by the operating system of the first client device 116 (e.g., considered an application of, but integral with, the operating system).

In some implementations, the remote computing device 112 can include a voice to text engine 120 that can process audio data received at an assistant interface to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can be parsed by a text parser engine 108 and made available to the automated assistant 104 as textual data that can be used to generate and/or identify command phrases from the user and/or an application 138 hosted at a remote computing device 136.

In some implementations, the automated assistant 104 can mediate interactions between a user and the application 138 that is accessible to the client device 116 and the automated assistant 104. Mediating interactions can include, but is not limited to, receiving commands from the user at the automated assistant 104 for invoking the application 138 to fulfill or respond to the commands During interactions between the user and the automated assistant 104, user data 106 and/or contextual data 122 can be collected at the client device 116, the server device 102, and/or any other device that can be associated with the user. User data 106 and/or contextual data 122 can be collected by one or more applications or devices that are integral with or accessible to the client device 116. For instance, contextual data 122 can include data corresponding to temporal data, location data, event data, social network data, media data, and/or any other data that can be relevant to interactions between the user and the automated assistant 104. Additionally, user data 106 can include account information, message information, calendar information, user preferences, historical interaction data between the user and the automated assistant 104, application data associated with applications that are accessible to the client device 116, and/or any other data that can be associated with a user.

In order for the automated assistant 104 to mediate interactions between the user and the application 138, the user can invoke the automated assistant 104 by providing a natural language input to an assistant interface 118 at the client device 116. For example, the natural language input can include, "Assistant, open my game application so that I can play." The natural language input can refer to the application 138, which can be a third party application that is provided by an entity that is different than an entity that is providing the automated assistant 104. Alternatively, the application 138 can be provided by the same entity that is providing the automated assistant 104. In order to determine or identify the application with which the user is referring, the automated assistant 104 can employ an application engine 126. The application engine 126 can use or access the user data 106 and/or the contextual data 122 in order to search, filter, and/or rank applications that are accessible to the client device 116 and/or the automated assistant 104. For example, the contextual data 122 can identify a specific gaming application that the user most recently accessed, therefore that specific gaming application can be identified by the automated assistant 104 in response to receiving the natural language input.

When the application 138 has been identified by the automated assistant 104, the automated assistant 104 can determine whether there are any cached or received schema files 110 available to the automated assistant 104 and associated with the identified application 138. In some implementations, the application engine 126 can manage a storage or table of schema files 110, along with a status of one or more schema files 110. For instance, a schema file 110 can be considered active or inactive depending on a variety of factors. Such factors can include a version of the application 138 that is installed on or accessible to the client device 116, contextual data 122 and/or user data 106 associated with the application 138, data from the remote device 136 that hosts the application 138, contents of the schema files 110, and/or any other information that can be associated with the application 138. In some implementations, the automated assistant 104 can access schema files 140 at the application 138 or remote device 136. The schema files 140 can be provided to the automated assistant 104 and/or the client device 116 by the application 138. Schema files can be provided to the automated assistant 104 and/or the client 116 when the user downloads a version of the application 138 at the client device 116. Alternatively, or additionally, the schema files 140 can be provided to the client device 116 and/or the automated assistant 104 in response to one or more requests for the schema files 140 from the client device 116 and/or the automated assistant 104. In some implementations, the automated assistant 104 can access a context specific schema file 110 associated with the application 138 and determine a response to the input from the user using the context specific schema file 110. In other implementations, the automated assistant 104 can access multiple contact specific schema files 110 associated with the application, and search through the schema files 110 to identify a schema file 110 that is most relevant to the input from the user. For example, searching through the schema files 110 can include comparing content of the input from the user with trigger data 132 provided in the schema files 110. Therefore, trigger data 132 that is most correlated to the input from the user can be used to select a corresponding schema file 110. For instance, a correlation between the input from the user and the trigger data 132 in the schema file 110 can be based on a comparison between text generated from input from the user and text provided in the trigger data 132.

In some implementations, data generated from an input received at the assistant interface 118 can be provided to the application 138, which can identify one or more schema files 140 provided to the automated assistant 104 based on the received data. In this way, the application 138 can search or filter the schema files 140 based on the receive data in order to identify a reduced number of schema files 140 that can be considered active by the automated assistant 104. For example, the data from the automated assistant 104 can be used to search the schema files for trigger data 132 and/or intent data 134. Intent data 134 can correspond to one or more commands or actions that can be performed by the application 138. Therefore, any actions or commands specified by the user in an input received at the assistant interface 118 can be used to identify specific schema files 140. The application 138 and/or the remote device 136 can transmit the identified schema files 140 over a network 114 to the server device 102 to allow the automated assistant 104 to access the identified schema files 140. Alternatively, or additionally, the automated assistant 104 can request the identified schema files 140 from the application 138.

In some implementations, when the automated assistant 104 has received one or more schema files 140 from the application 138, the automated assistant 104 can determine a response to be provided to the user. The response can be based on trigger data 132, which can correspond to data to be supplied to a function for execution by the application 138. For example, when the automated assistant 104 receives input data corresponding to the user input, "Assistant, open my game application so that I can play," the automated assistant 104 can identify one or more slots that should be filled by supplemental data from the user. For example, when the trigger data 132 indicates that a type of game needs to be selected by the user, the automated assistant can generate a response requesting the supplemental data, such as, "Ok, what type of game would you like to play?" In response, the user can provide the supplemental data (e.g., "I would like to play chess."), which can be converted to one or more slot values. The automated assistant 104 can provide the slot values back to the application 138 in order for application 138 to complete performance of the action that the user was intending to invoke.

In some implementations, trigger data 132 can include data to be incorporated into a response from the automated assistant 104. For instance, when the automated assistant 104 receives a context specific schema file 140 from the application 138, the automated assistant 104 can search the schema file 140 for trigger data 132 associated with the user input. In response to the user input, "Assistant, open my game application so that I can play," the automated assistant can use the received schema file 140 and identify types of games that can be played using the game application. The types of games can then be identified in the response that is provided back to the user at the assistant interface 118 (e.g., Would you like to play chess, go, or checkers?).

In some implementations, the automated assistant 104 can access one or more schema files 140, or store one or more schema files 110, based on a state or status of the automated assistant 104 and/or the application 138. For example, the application 138 can store or manage one or more status identifiers 142, which can correspond to a number of active context specific schema files 140 and/or schema files 110 that are accessible to the automated assistant 104. In other words, depending on the interactions between the user and the automated assistant 104, different context specific schema files 140 can be active or inactive, and therefore a status associated with the context specific schema files 140 can change. For instance, when a user invokes the automated assistant 104 to access an application 138, a first status can be associated with the application 138, and a first set of schema files can be active or otherwise accessible to the automated assistant 104. When the application 138 has performed an initial operation in response to being accessed by the automated assistant 104, the status associated with the application 138 can change to a second status. The second status can be associated with a second set of schema files, which can be active or otherwise accessible to the automated assistant 104 subsequent to the application 138 performing the initial operation. For instance, the initial operation can be processing a selection of a type of game to be played by the user through the application 138. Once the type of game has been selected, the second set of schema files can include one or more schema files 140 that include intent data 134 for actions such initializing game play of the selected type of game. In some implementations, the first set of schema files can include at least one schema file that is not included in the second set of schema files. Each schema file can be a JSON file and/or any other file that can include a list or a table of data that can be used by an automated assistant 104 when responding to a user. Furthermore, the application 138 can be a game application, navigation application, ride sharing application, social networking application, media application, shopping application, search application, communication application, and/or any other application that can be accessed by an automated assistant.

Figure 2:
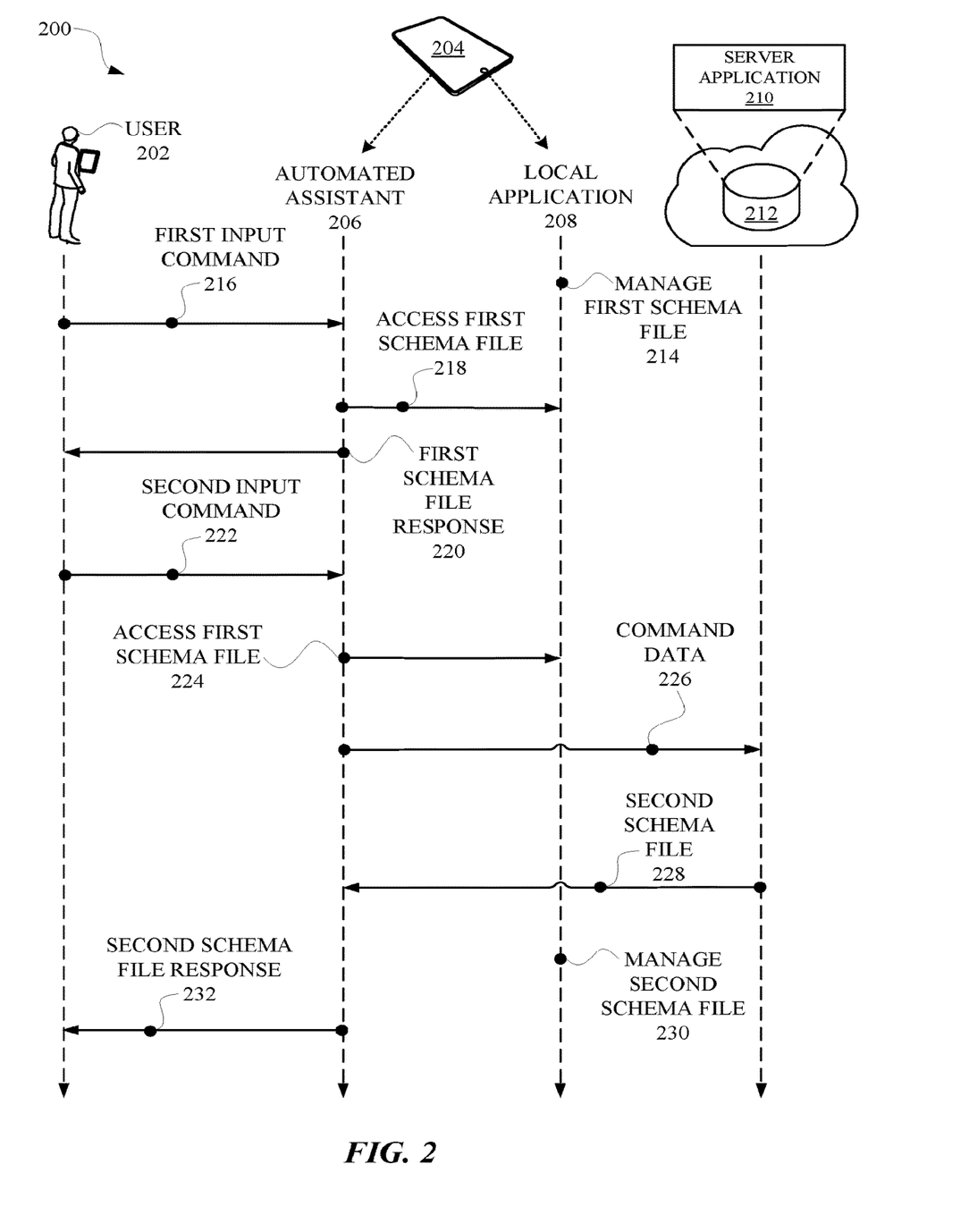
FIG. 2 provides a diagram that illustrates how an automated assistant can manage multiple context specific schema files for enabling the automated assistant to mediate interactions between a user and an application.

FIG. 2 provides a diagram 200 that illustrates how an automated assistant 206 can manage multiple context specific schema files for enabling the automated assistant 206 to mediate interactions between a user 202 and an application. In some implementations, the automated assistant 206 can correspond to the automated assistant 104, the server application 210 can correspond to the application 138, and the local application 208 can correspond to an application that is associated with application 138 and loaded onto the client device 116. The context specific schema files can originate at a local application 208, and/or a remote device 212 such as a server device that hosts a server application 210 that is accessible to the local application 208. In some implementations, the context specific schema files can be stored at a computing device 204, which can be operated by the user 202, and/or the remote device 212. The local application 208 can correspond to an at least partial installation of an application. The partial installation of the application can require management of a first schema file 214. The first schema file can include triggers, intents, slot data, fulfillment data, and/or any other data that can be used by an automated assistant to interact with an application. The partial installation of the application can allow the user 202 to perform a reduced number of functions compared to a full installation of the application. Furthermore, in order to allow the automated assistant 206 to mediate interactions between the user and the partial installation of the application, the first schema file can be made accessible to the automated assistant 206 at the computing device 204. In this way, the automated assistant 206 will be able to interact with the local application 208 without necessarily contacting the server application 210. This can reduce latency that would otherwise be exhibited at the computing device 204 when the automated assistant 206 and/or the local application 208 communicate with non-local devices in order to respond to a request from the user 202. In some implementations, the application corresponding to FIG. 2 can refer to a complete or full installation of an application.

When the local application 208 has been installed at the computing device 204, the user 202 can provide a first input command 216 to the automated assistant 206 via an assistant interface at the computing device 204. For example, the local application 208 can correspond to a partial installation of a ride sharing application. The first input command 216 can therefore be, "Assistant, order a ride for me." In response to receiving the first input command 216, the automated assistant 206 can access a storage device available to the computing device 204 to determine whether any schema files are active at the computing device 204. Because the first schema file 214 was provided with the local application 208, the first schema file 214 can be identified by the automated assistant 206 as an active schema file. In some implementations, the computing device 204 can store multiple different schema files associated with multiple different applications. Therefore, in order for the automated assistant 206 to identify a schema file that corresponds to the first input command 216, the automated assistant 206 can compare contents of the first input command 216 to contents of the available schema files. The schema files can thereafter be ranked or filtered according to how similar their contents are to the content of the first input command 216. A schema file that is ranked highest, or is isolated from the filtering process, can be accessed in order to identify slot values and/or the filament data that can be used to respond to the user.

When the automated assistant 206 has identified an active schema file, and/or isolated a schema file from multiple schema files, the automated assistant 206 can generate a response to the user 202 using the schema file. For example, if the first schema file 214 is identified by the automated assistant 206, contents of the first schema file 214 can be used to generate a first schema file response 220, which can be provided back to the user 202. For instance, contents of the first schema file 214 can include intent data that can act as entry points for invoking the local application 208, as well as fulfillment data that can provide information from which the automated assistant 206 can respond to queries from the user 202. The intent data can include, for example, a list of intent identifiers (e.g., "intents: 'register'; 'order'; 'location'; 'destination';) corresponding to actions that the local application 208 can perform. Furthermore, the fulfillment data can include a list of words or phrases (e.g., "fulfillment: 'register': 'provide email address'; 'order': 'select a type of ride'; 'location': 'provide your location'; 'destination': 'provide your destination';) corresponding to responsive content that can be provided back to the user via the automated assistant 206. In this way, the automated assistant 206 can correlate the first input command 216 to the first schema file 214, to identify an action provided in the first schema file 214, and/or responsive content that can be used to generate a response for the user 202.

When the automated assistant 206 has identified responsive content that satisfies the first input command 216, the automated assistant 206 can provide a first schema file response 220 back to the user 202. The first schema file response 220 can be a response transmitted through an automated assistant interface with content that is based on the response of content from the first schema file 214. For example, in response to the user 202 providing a natural language input command such as, "Assistant, order a ride for me," the automated assistant 206 can provide a first schema file response 220 such as, for example, "Ok, 'select a type of ride.'" In this way, the automated assistant 206 is able to compile responsive content from a schema file without invoking the server application 210 and/or any other device that is separate from the computing device 204. This can reduce latency that would otherwise be exhibited by the automated assistant 206 when communicating over a network with one or more other network devices, such as the remote device 212.

In furtherance of causing the local application 208 to perform one or more actions via the automated assistant 206, the user 202 can provide a second input command 222 to the automated assistant 206. For example, subsequent to providing the first input command 216, the user 202 can provide the details necessary for the local application 208 to perform an action identified in the first schema file 214. The details can include, for instance, the location for the user 202 to be picked up, the destination for the user 202 to be dropped off, and/or any other information that the local application 208 can require for performing the action. Therefore, at the time the user 202 provides the second input command 222, the local application 208 and/or the automated assistant 206 can be operating in a different context. For example, the different context can correspond to a waiting period when the ride has been ordered and is on the way to the user 202 to pick up the user 202.

In some implementation, the automated assistant 206 and/or the local application 208 can generate an identifier for the context in which the local application 208 and/or the automated assistant 206 are operating. The identifier can be transmitted to the server application 210, and/or be used by the local application 208, in order to identify a schema file that corresponds to the context. Alternatively, or additionally, the automated assistant 206 and/or the local application 208 can search through one or more schema files stored at the computing device 204 to identify a schema file that is most relevant to the context in which the automated assistant 206 and/or the location application 208 are operating.

In some implementations, the automated assistant 206 can compare content of the second input command 222 to content of the first schema file 214 in order to determine whether to access a different schema file. For instance, the second input command 222 can include a natural language input such as, "Assistant, what is the status of my ride?" In response to receiving the second input command 222, the automated assistant 206 and/or the local application 208 can access the first schema file 224 to determine whether the first schema file includes responsive content that will satisfy the second input command 222. If the first schema file 214 includes responsive content that satisfies the second input command 222, the automated assistant 206 can generate a response for the user 202 based on the responsive content of the first schema file 214. However, if the first schema file 214 does not include responsive content that is capable of satisfying the second input command 222, the automated assistant and/or the local application 208 can retrieve a different schema file for providing responsive content.

In some implementations, the automated assistant 206 and/or the local application 208 can communicate command data 226 to the server application 210. The command data 226 can be associated with the second and input command 222, and therefore identify one or more actions that the user 202 is requesting the local application 208 to perform. Alternatively, and/or additionally, the command data 226 can identify a context in which the automated assistant 206 and/or the local application 208 are operating. By providing the command data 226 to the server application 210, the server application 210 can identify one or more schema files to provide to the automated assistant 206 and/or the local application 208. Any subsequent schema file provided to the automated assistant 206 and/or the local application 208 can further the interaction between the user 202 and the local application 208, without having to immediately communicate with a remote device. For instance, based on the command data 226, the server application 210 can identify and/or transmit a second schema file 228, which can be provided to the automated assistant 206 and/or the local application 208. The first schema file 214 and/or the second schema file 228 can include at least some amount a different content. For example, the second schema file 228 can identify at least one action that the first schema file 214 is void of or is otherwise not identified within.

In response to the second schema file 228 being received at the computing device in 204, the local application 208 can manage the second schema file 230. In order to provide a response to the second input command 222, the automated assistant can compare content from the second input command 222 to content from the second schema file 228. For example, the second input command 222 can be, for example, "Assistant, what is the status of my ride," and the second schema file 228 can identify an action corresponding to a status check for an incoming ride. The second schema file 228 can include intent data (e.g., "intents: 'status'; 'price'; 'driver';) corresponding to actions that the local application 208 can perform as well as fulfillment data, which can include a list of words or phrases (e.g., "fulfillment: 'status': 'your ride will arrive at 5:42 PM'; 'price': 'your ride will cost $14.04'; 'driver': 'your driver is Alfred';) that can be used to respond the second input command 222.

The automated assistant 206 can access the second schema file 228 in order to identify a correspondence between contents of the second input command 222 (e.g., "status") with contents of the second schema file 228 (e.g., "fulfillment: 'status'"). The correspondence can be used to generate responsive content that can be used to provide a response to the second input command 222. For example, the fulfilment data, "your ride will arrive at 5:42 PM" can correspond to the intent data, "action," which can both be identified in the second schema file 228. Therefore, the automated assistant 206 can provide a second schema file response 232 based on the correspondence. For instance, the second schema file response 232 provided by the automated assistant 206 can be, "Ok, your ride will arrive at 5:42 PM." Should the user 202 decide to provide subsequent input commands that correspond to intents identified in the second schema file 228, the automated assistant 206 can provide responses to the user 202 without contacting the server application 210. As a result, latency exhibited by the automated assistant 206 and/or the local application 208 can be mitigated or eliminated by providing one or more schema files that can be dynamically updated based on a context of an interaction between the user 202 and an automated assistant 206.

Figure 3:
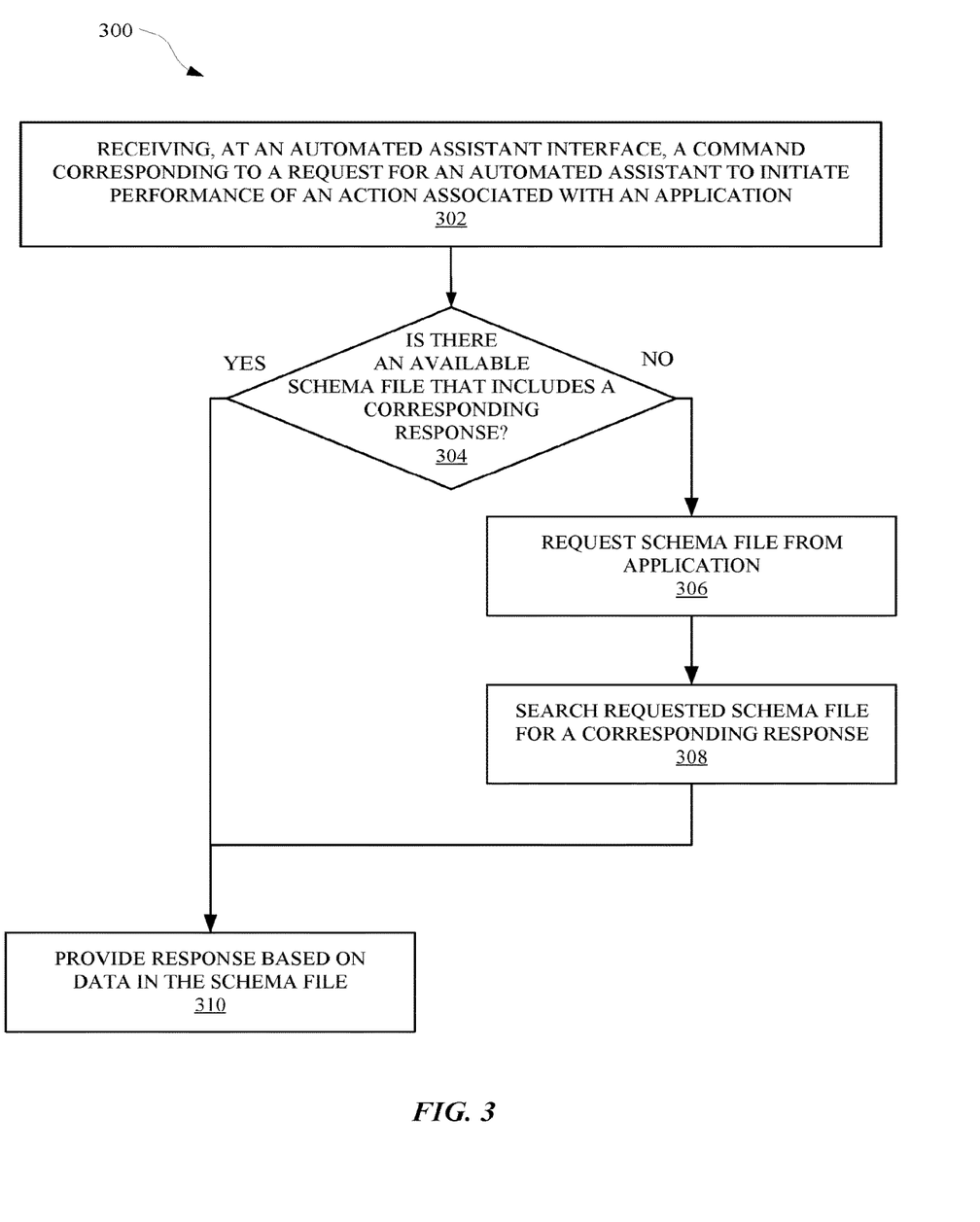
FIG. 3 illustrates a method for providing a response to a user of an automated assistant based on a schema file that is accessible to the automated assistant.

FIG. 3 illustrates a method 300 for providing a response to a user of an automated assistant based on a schema file that is accessible to the automated assistant. The method 300 can be performed by one or more applications and/or devices suitable for interacting with an automated assistant. The method 300 can include an operation 302 of receiving, at an automated assistant interface, a command. The command can correspond to a request for an automated assistant to initiate performance of an action associated with an application. The automated assistant interface can be located at a computing device and include one or more of a microphone, a touch display, a camera, a sensor, and/or any other application or device capable of receiving inputs from a user. For example, the command can correspond to a spoken natural language input that is received at a microphone of the computing device. The spoken natural language input can be, for instance, "Assistant, please order more office supplies." The command can be intended for an application that is accessible to the automated assistant or the computing device. The application can be any application capable of being controlled by an automated assistant or other application. For example, the application can be a shopping application capable of being controlled by an automated assistant that is being operated at the direction of the user.

The application can be associated with one or more context specific schema files that can be made accessible to the automated assistant. The context specific schema files can identify trigger words or phrases that can be used by the user to invoke the automated assistant to interact with the application. The context specific schema files can also include response data corresponding to content that can be used by the automated assistant to respond to the user on behalf of the application. Optionally, the context specific schema files can also include intent data, which can identify actions that can be performed by the application upon request by the automated assistant. In order to cause the automated assistant to interact with the application, the command provided by the user can include content corresponding to a context specific schema file that is associated with the application and available to the automated assistant.

The method 300 can further include an operation 304 of determining whether there is an available schema file that includes a corresponding response for the command provided by the user. The determination made at operation 304 can be performed by the automated assistant or by the application. For example, the automated assistant can access a storage available to the automated assistant for determining whether there are any context specific schema files associated with the application. Alternatively, the automated assistant can access multiple different file storage locations in order to determine whether any context specific schema files are associated with the application. If there is a context specific schema file associated with the application, then the method 300 can proceed to operation 310 where a response is provided to the user based on data available in the context specific schema file. However, if there is no context specific data file that is associated with the application and currently accessible to the automated assistant, the method 300 can proceed to operation 306.

At operation 306 of the method 300, a request for a context specific schema file is provided to the application or an entity associated with the application. For example, in response to determining that there is no context specific schema file currently active and/or accessible to the automated assistant, the automated assistant can generate a request to receive at least one context specific schema file. The request can include data that is based on the command received from the user. For instance, the request can identify a word or phrase from the command, a subject matter of the command, an action associated with the command, and/or any other data that can be used to identify an appropriate context specific schema file. In some implementations, the request can include context data, which can be based on a context in which the user has provided the command to the automated assistant interface. The context data can include user account information, temporal data, geographic data, historical command data, device descriptive data, schedule or calendar data, search history data, and/or any other contextual data that can be used by an application. In response to receiving the context data with the request, the application can identify one or more suitable context specific schema files to provide to the automated assistant.

At operation 310 of the method 300, the automated assistant can provide a response to the command from the user based on data that is provided in the context specific schema file from the application. In some implementations, the context specific schema file can include a list of responses that are associated with the command provided to the automated assistant and/or the context with which the user is interacting with the automated assistant. In some implementations, the response can be a natural language output such as audible words and/or phrases generated by the automated assistant, text presented at a display of the computing device, and/or any other output that can be provided by a computing device. In some implementations, the response can identify an action to be performed by the application and/or slot values to be filled by content of subsequent inputs from the user to the automated assistant and/or the application.

Figure 4:
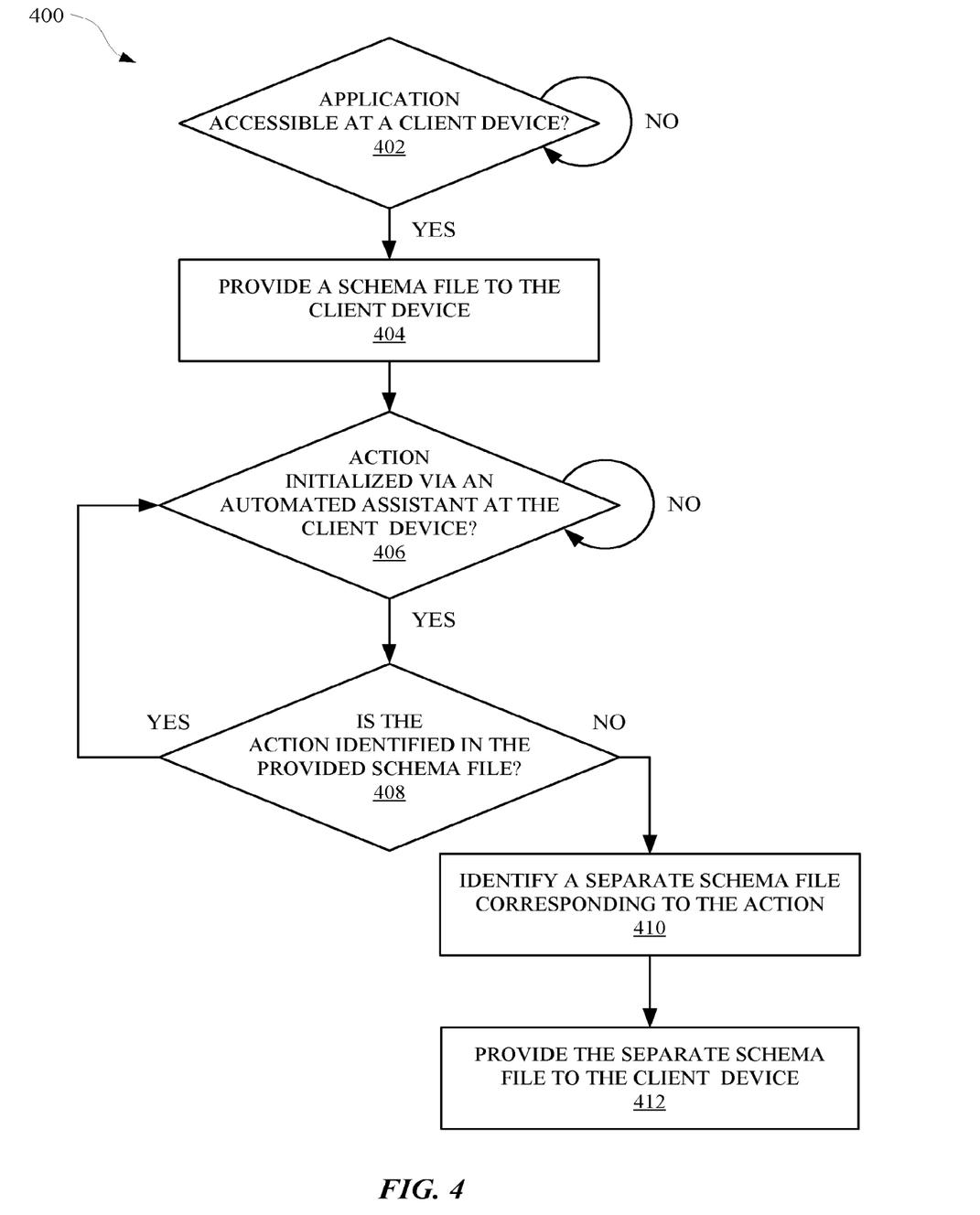
FIG. 4 illustrates a method providing a context specific schema file according to a context in which an application is being accessed at a client device.

FIG. 4 illustrates a method 400 for providing a context specific schema file according to a context in which an application is being accessed at a client device. The method 400 can be performed by one or more computing devices and/or one or more applications that are suitable for communicating with an automated assistant or any other application. The method 400 can include an operation 402 of determining whether an application is accessible at a client device. The determination at operation 402 can include acknowledging a request to download an application, acknowledging a request to register a user to use an application, providing data for at least partially installing an application, and/or receiving or accessing any other communication from a device that is associated with or includes the client device. The application can be any program or script that can operate at a computing device and can be controlled using an automated assistant that can receive natural language input from a user at an automated assistant interface of the computing device. For example, the application can be an internet of things (IOT) application that is loaded onto an IOT device or robotic device that is located within a home of a user. In some implementations, the application can correspond to a partial installation of an application or a trial version of an application, which allows the user to control the application with at least a limited amount of functionality. However, in other implementations the application can be a complete installation of an application that allows the user to control the application with complete functionality. For example, the application can be one that is loaded onto an appliance or robotic hardware within the home of the user, and the application can allow the user to control the appliance via the application. Furthermore, the automated assistant can act as a mediator between the user and the application, thereby allowing the automated assistant to initialize actions of the application at the request of the user.

The method 400 can further include an operation 404, which can be performed when the operation 402 positively determines that the application is accessible to the client device. Specifically, the operation 404 can include providing a schema file to the client device. In some implementations, the schema file can be provided to the client device as part of the application or separate from the application. The schema file can define entry points through which the automated assistant and/or the user can access the application. For example, the schema file can identify intents or actions that the user can request the application to perform. The automated assistant can access the schema file to determine the entry points, and therefore correlate natural language input from the user to contents of the schema file in order to determine whether the user is seeking to invoke or initialize the application. For example, when the client device is an IOT device such as an appliance in a home of the user, the user can provide a spoken natural language input such as, "Assistant, please start my appliance." The input can cause the automated assistant to initialize performance of one or more actions by the application or IOT device.

The method 400 can also include an operation 406 of determining whether an action has been initialized via the automated assistant at the client device. The operation 406 can be performed at a remote device that is associated with the application at the client device. For example, the remote device can be a server that hosts data corresponding to the application and/or the user. When the user initializes performance of an action by the application via the automated assistant, the automated assistant and/or the client device can transmit data to the remote device indicating that a request has been made to initialize performance of the action by the application. Furthermore, or optionally, the automated assistant can access the schema file that is provided at the client device to determine whether the automated assistant needs any additional data that is not available at the client device. In other words, the automated assistant can compare the action requested by the user to intent data that is provided in the schema file to determine whether the application loaded at the client device can perform the action. Alternatively, or optionally, the remote device can receive the data transmitted from the client device and determine whether the client device has a schema file that provides some correspondence to the action requested by the user. For example, the data transmitted by the client device can identify the action requested by the user, and the remote device can process the data to determine whether the schema file at the client device identifies the action requested by the user.

The method 400 can further include an operation 408 for determining whether the action is identified in the provided schema file. For example, when the input from the user includes, "Assistant, please start my appliance," the content of the input can be compared to the contents of the schema file provided to the client device. The schema file can include, for instance, intent data such as "intents: 'start;' 'stop;' therefore the content can include some correspondence to the intent data. For instance, the user requested to "start" the appliance, and the request therefore corresponds to the schema file identifying the action "start" in the intent data.

When the schema file includes content data corresponding to the action requested by the user, the method 400 can proceed to operation 406 to determine whether any other action has been requested by the user or the automated assistant. In other words, because the schema file identifies the action requested by the user, the client device and/or the automated assistant will have the information needed to satisfy requests associated with the action. For example, the provided schema file can include fulfillment data such as, "fulfillment: 'start:' 'please advise when to stop or pause,'" which can be used by the automated assistant as a response to the initial request to initialize the action. For instance, a response to the request can include, "Ok, 'please advise when to stop or pause,'" thereby putting the user on notice of other actions (e.g., "stop" and "pause") that can be performed within the current context of the start action being initialized.

When the client device does not include or have immediate access to a schema file that identifies the action, the method 400 can proceed to operation 410. The operation 410 can include identifying a separate schema file corresponding to the action. In order to identify the separate schema file corresponding to the action, one or more different schema files can be searched using data that is based on the request from the user. For instance, the data can identify an action requested to be performed by the user and each of the different schema files can be searched to determine whether one or more of the schema files include intent data that identifies the action. In some implementations, the client device and/or the automated assistant can provide contextual data that identifies a context in which the user provided the request to the automated assistant. The contextual data can be used to rank and/or filter the different schema files in order to identify one or more schema files to provide to the client device. The contextual data can be compared to the intent data, the fulfillment data, slot data, and/or any other data that can be incorporated into the schema file. For example, if the request includes content that identifies a term that is similar to or synonymous with a term that is provided in the fulfillment data of a schema file, the schema file can be ranked higher than another schema file that does not include a similar or synonymous term.

When a separate schema file has been selected, the method 400 can proceed to operation 412 where the separate schema file is provided to the client device. In some implementations, the separate schema file can be transmitted over a network from the remote device to the client device. Alternatively, or optionally, the automated assistant can request the separate schema file from the remote device, or copy the separate schema file from the remote device. The separate schema file can include intent data and/or fulfillment data that the previously provided schema file is void of. Furthermore, the separate schema file can identify multiple different actions that can be performed by the application and various responsive content that can be adopted by the automated assistant for responding to the user. In this way, the automated assistant does not necessarily need to communicate with the remote device in order to provide responses to the user when the application is performing the action or any other function associated with the schema file(s) provided to the client device. As a result, latency, computational resources, and/or power can be preserved at the computing device, as well as any other device that may be tasked with assisting in performance of the action requested by the user.

Figure 5:
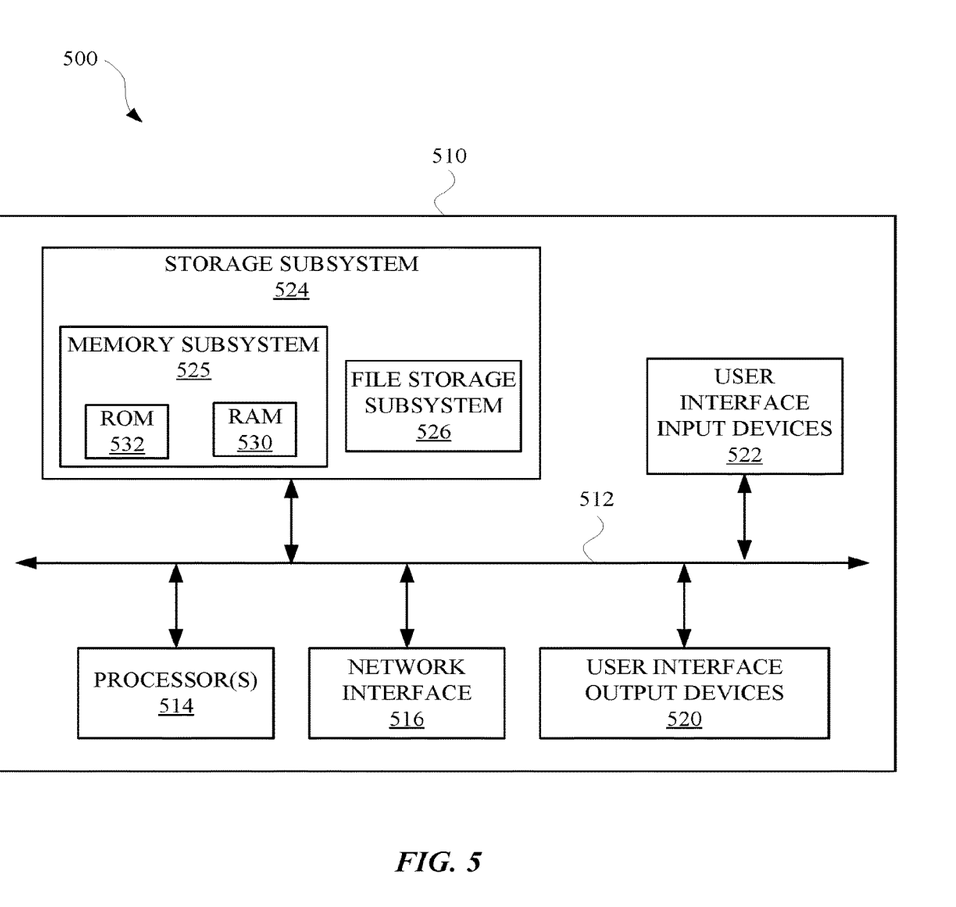
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or to implement one or more of client device 116, server device 102, remote computing device 112, remote device 136, schema file 140, application 138, computing device 204, remote device 212, automated assistant 104, automated assistant 206, local application 208, and/or server application 210.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
receiving, at an automated assistant interface, a first request for an automated assistant to mediate performance of an action by an application that is separate from the automated assistant;
determining, by the automated assistant, whether a context specific schema file is accessible to the automated assistant and includes content that corresponds to the action to be performed by the application, wherein the context specific schema file is configured to enable the automated assistant to provide responses on behalf of the application;
when the automated assistant determines that the context specific schema file is accessible and provides content that corresponds to the action to be performed by the application:
causing the application to initialize performance of the action;
receiving, at the automated assistant interface, a second request for the automated assistant to provide a response that is associated with the action being performed by the application;
determining, by the automated assistant, whether the content of the context specific schema file is capable of satisfying the second request; and
when the automated assistant determines that the content of the context specific schema file is capable of satisfying the second request:
generating the response according to the content of the context specific schema file.

2. The method of claim 1, when the automated assistant determines that the content of the context specific schema file is incapable of satisfying the second request:
generating a schema file request, wherein the schema file request corresponds to a query for retrieving another context specific schema file for fulfilling the second request.

3. The method of claim 2, when the automated assistant determines that the content of the context specific schema file is incapable of satisfying the second request:
receiving the other context specific schema file, and
generating a separate response according to other content that is provided in the other context specific schema file.

4. The method of claim 2, wherein the schema file request includes contextual data that identifies a context in which the automated assistant received the first request.

5. The method of claim 1, when the automated assistant determines that the content of the context specific schema file is void of content that corresponds to the action to be performed by the application:
generating a schema file request, wherein the schema file request corresponds to a query for retrieving another context specific schema file that includes content corresponding to the action to be performed by the application.

6. The method of claim 5, when the automated assistant determines that the content of the context specific schema file is void of content that corresponds to the action to be performed by the application:
receiving the other context specific schema file, and
causing the application to initialize performance of the action at least based on other content provided in the other context specific schema file.

7. The method of claim 1, wherein determining whether the context specific schema file is accessible to the automated assistant includes:
accessing a file storage that includes one or more context specific schema files, and
comparing request content from the first request to schema file content from the one or more context specific schema files.

8. A system comprising one or more processors and memory operably coupled with the one or more processors, wherein the memory stores instructions that, in response to execution of the instructions by one or more processors, cause the one or more processors to perform the following operations:

receiving, at an automated assistant interface, a first request for an automated assistant to mediate performance of an action by an application that is separate from the automated assistant;

determining, by the automated assistant, whether a context specific schema file is accessible to the automated assistant and includes content that corresponds to the action to be performed by the application, wherein the context specific schema file is configured to enable the automated assistant to provide responses on behalf of the application;

when the automated assistant determines that the context specific schema file is accessible and provides content that corresponds to the action to be performed by the application:
  causing the application to initialize performance of the action;

receiving, at the automated assistant interface, a second request for the automated assistant to provide a response that is associated with the action being performed by the application;

determining, by the automated assistant, whether the content of the context specific schema file is capable of satisfying the second request; and when the automated assistant determines that the content of the context specific schema file is capable of satisfying the second request:
  generating the response according to the content of the context specific schema file.

9. The system of claim 8, when the automated assistant determines that the content of the context specific schema file is incapable of satisfying the second request:
  generating a schema file request, wherein the schema file request corresponds to a query for retrieving another context specific schema file for fulfilling the second request.

10. The system of claim 9, when the automated assistant determines that the content of the context specific schema file is incapable of satisfying the second request:
  receiving the other context specific schema file, and
  generating a separate response according to other content that is provided in the other context specific schema file.

11. The system of claim 9, wherein the schema file request includes contextual data that identifies a context in which the automated assistant received the first request.

12. The system of claim 8, when the automated assistant determines that the content of the context specific schema file is void of content that corresponds to the action to be performed by the application:
  generating a schema file request, wherein the schema file request corresponds to a query for retrieving another context specific schema file that includes content corresponding to the action to be performed by the application.

13. The system of claim 12, when the automated assistant determines that the content of the context specific schema file is void of content that corresponds to the action to be performed by the application:
  receiving the other context specific schema file, and
  causing the application to initialize performance of the action at least based on other content provided in the other context specific schema file.

14. The system of claim 8, wherein determining whether the context specific schema file is accessible to the automated assistant includes:

accessing a file storage that includes one or more context specific schema files, and
comparing request content from the first request to schema file content from the one or more context specific schema files.

15. At least one non-transitory computer-readable medium comprising instructions that, in response to execution of the instructions by one or more processors, cause the one or more processors to perform the following operations:

receiving, at an automated assistant interface, a first request for an automated assistant to mediate performance of an action by an application that is separate from the automated assistant;

determining, by the automated assistant, whether a context specific schema file is accessible to the automated assistant and includes content that corresponds to the action to be performed by the application, wherein the context specific schema file is configured to enable the automated assistant to provide responses on behalf of the application;

when the automated assistant determines that the context specific schema file is accessible and provides content that corresponds to the action to be performed by the application:
  causing the application to initialize performance of the action;

receiving, at the automated assistant interface, a second request for the automated assistant to provide a response that is associated with the action being performed by the application;

determining, by the automated assistant, whether the content of the context specific schema file is capable of satisfying the second request; and when the automated assistant determines that the content of the context specific schema file is capable of satisfying the second request:
  generating the response according to the content of the context specific schema file.

16. The non-transitory computer-readable medium of claim 15, when the automated assistant determines that the content of the context specific schema file is incapable of satisfying the second request:
  generating a schema file request, wherein the schema file request corresponds to a query for retrieving another context specific schema file for fulfilling the second request.

17. The non-transitory computer-readable medium of claim 16, when the automated assistant determines that the content of the context specific schema file is incapable of satisfying the second request:
  receiving the other context specific schema file, and
  generating a separate response according to other content that is provided in the other context specific schema file.

18. The non-transitory computer-readable medium of claim 16, wherein the schema file request includes contextual data that identifies a context in which the automated assistant received the first request.

19. The non-transitory computer-readable medium of claim 15, when the automated assistant determines that the content of the context specific schema file is void of content that corresponds to the action to be performed by the application:
  generating a schema file request, wherein the schema file request corresponds to a query for retrieving another context specific schema file that includes content corresponding to the action to be performed by the application.

20. The non-transitory computer-readable medium of claim 19, when the automated assistant determines that the content of the context specific schema file is void of content that corresponds to the action to be performed by the application:
  receiving the other context specific schema file, and
  causing the application to initialize performance of the action at least based on other content provided in the other context specific schema file.

* * * * *